United States Patent [19]

Higashihara et al.

[11] Patent Number: 4,519,057

[45] Date of Patent: May 21, 1985

[54] DIGITAL AUDIO DISC PLAYER INCLUDING APPARATUS FOR FINDING THE BEGINNING OF A RECORDED AUDIO SIGNAL

[75] Inventors: Teruaki Higashihara, Tokyo; Chiaki Nonaka; Tadao Yoshida, both of Kanagawa; Hideo Kawachi, Chiba, all of Japan

[73] Assignee: Sony Corporation, Tokyo, Japan

[21] Appl. No.: 409,120

[22] Filed: Aug. 18, 1982

[30] Foreign Application Priority Data

Aug. 21, 1981 [JP] Japan .............................. 56-131909

[51] Int. Cl.³ .................. G11B 7/00; G11B 17/02; G11B 27/10
[52] U.S. Cl. ........................................ 369/50; 369/32; 369/44
[58] Field of Search ...................... 369/32–33, 369/41, 43–46, 50–51, 59, 111; 358/342; 360/78, 77, 72.1, 72.2, 74.4

[56] References Cited

U.S. PATENT DOCUMENTS 4,124,868 11/1978 Malissin et al. ........................ 369/44
4,332,022 5/1982 Ceshkovsky et al. ................. 369/50
4,397,009 8/1983 Eriksson ................................. 369/32
4,403,259 9/1983 Masaki ................................... 369/32

Primary Examiner—Raymond F. Cardillo, Jr.
Attorney, Agent, or Firm—Lewis H. Eslinger; Alvin Sinderbrand

[57] ABSTRACT

An apparatus for playing information recorded on a disc in substantially circular tracks on the latter includes a device for rotating the disc; a pickup for reproducing the information recorded on the disc; a tracking control circuit for adjusting the tracking position of the pickup in forward and reverse transverse directions with respect to the tracks; and a circuit operative through the tracking control circuit for selectively establishing a slow-playback mode and a reverse slow-playback mode in each of which, after the pickup reproduces a respective first predetermined number of the tracks while moving in the forward transverse direction, the tracking position of the pickup is moved in the reverse transverse direction a respective second predetermined integral number of tracks, the second predetermined number of tracks being less than twice the first predetermined number of tracks.

14 Claims, 14 Drawing Figures

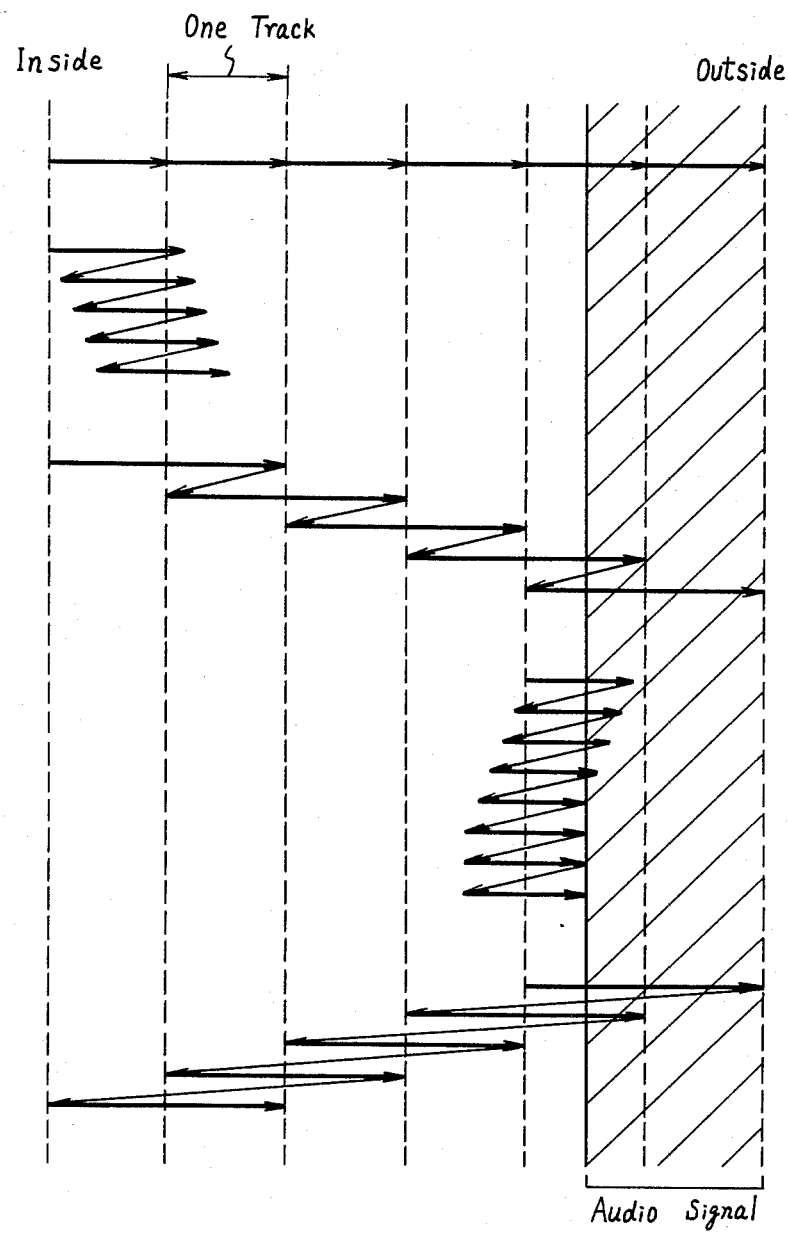

DIGITAL AUDIO DISC PLAYER INCLUDING APPARATUS FOR FINDING THE BEGINNING OF A RECORDED AUDIO SIGNAL

BACKGROUND OF THE INVENTION

1. Field of the Invention

This invention relates to digital audio disc players, and more particularly, to a digital audio disc player with a slow-playback mode and a reverse slow-playback mode.

2. Description of the Prior Art

In a digital audio disc player, a spindle motor rotates a digital audio disc usually in a counter-clockwise direction, as viewed from the underside of the disc. A pickup device is located opposite the disc on its underside and continuously moves from the inner periphery to the outer periphery. A transporting mechanism, such as a worm gear and a motor, is used to move the pickup device with respect to the disc. A frequency generator is provided to detect the rotational velocity of the spindle motor. The detected signal from the frequency generator is applied to a control circuit for the motor so that the motor rotates by a predetermined amount at each revolution of the disc. The signal indicating the position of the pickup device is supplied to a control circuit for the spindle motor to control it so that the disc rotates at a constant linear velocity.

In a digital audio disc, data indicating the playing time of each recorded musical selection can be inserted before the actual commencement of the respective selection. Further, time indicating data are inserted at 1/10th second intervals beginning from a zero point, and the beginning of a desired selection is generally accessed by detecting the time indicating data. In practice, however, each selection begins at some point which is several seconds away from the respective zero point. Thus, if the pickup device is located adjacent the zero point, a few seconds of silence, or dead air, occurs between the beginning of the reproduction operation and the actual reproduction of music. This dead air is undesirable when a digital audio disc is broadcast from a radio station.

Furthermore, certain prior art methods of reproducing a selected portion of a digital audio disc require a knowledge of the playing time of the selected portion before it can be reproduced.

OBJECTS AND SUMMARY OF THE INVENTION

Accordingly, it is an object of the present invention to provide a digital audio disc player which has a slow-playback mode and a reverse slow-playback mode.

It is another object of the present invention to provide a digital audio disc player in which the slow-playback mode, and the reverse slow-playback mode can be used to find or access the beginning of music or another information signal recorded on the digital audio disc.

In accord with an aspect of the present invention, an apparatus for reproducing information recorded on a disc in substantially circular tracks on the latter includes a device for rotating the disc; a pickup for reproducing the information recorded on the disc in the tracks; a tracking control circuit for adjusting the tracking position of the pickup in forward and reverse transverse directions with respect to the tracks; and a circuit operative through the tracking control circuit for selectively establishing a slow-playback mode and a reverse slow-playback mode in each of which, after the pickup reproduces a respective first predetermined number of the tracks while moving in the forward transverse direction, the tracking position of the pickup is moved in the reverse transverse direction a respective second predetermined integral number of the tracks, the second predetermined integral number of tracks being less than twice the first predetermined number of tracks.

The above, and other objects, features and advantages of the invention will be apparent from the following detailed description of an illustrative embodiment thereof, which is to be read in connection with the accompanying drawings.

BRIEF DESCRIPTION OF THE DRAWINGS

FIGS. 4A through 4E are schematic diagrams illustrating the playback operation of a digital audio disc in accord with the present invention;

DESCRIPTION OF THE PREFERRED EMBODIMENT

Figure 1:
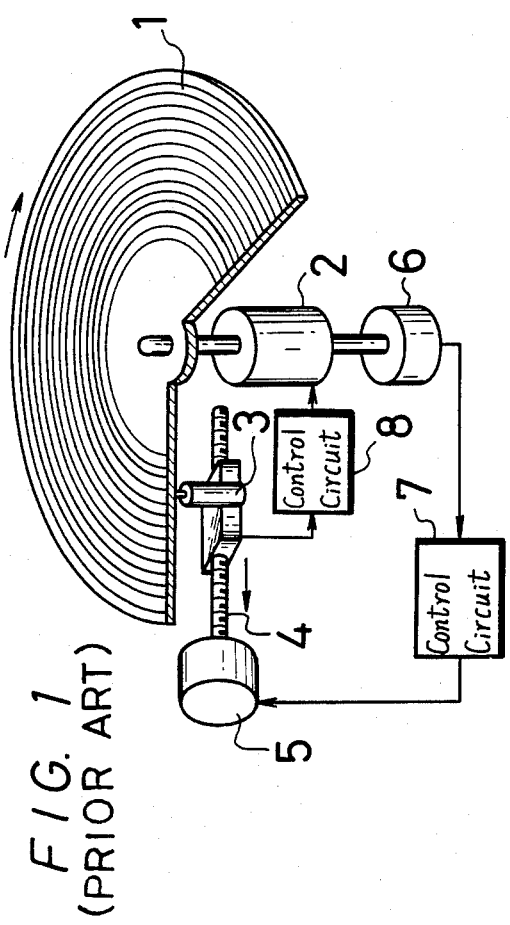
FIG. 1 is a schematic diagram illustrating a prior art digital audio disc player.

In a prior art digital audio disc player of FIG. 1, a spindle motor 2 rotates a digital audio disc (hereinafter referred to as a DAD) in a counter-clockwise direction as viewed from the underside of DAD 1. A pickup apparatus or device 3 is located in opposition to DAD 1 on the underside and moves continuously during reproduction of DAD 1 from the inner periphery to the outer periphery. A moving or transporting mechanism, comprising a worm gear 4 and a motor 5, is included in the illustrated digital audio disc player. A detecting device, such as a frequency generator 6, is provided for detecting the rotational velocity of spindle motor 2. An output signal indicating the detected velocity of spindle motor 2 is supplied to a control circuit 7 for motor 5, whereby motor 5 rotates by a predetermined amount at each revolution of DAD 1. A signal indicating the position of pickup device 3 is supplied to a control circuit 8 for spindle motor 2 to control motor 2 whereby DAD 1 rotates at a constant linear velocity.

Figure 2:
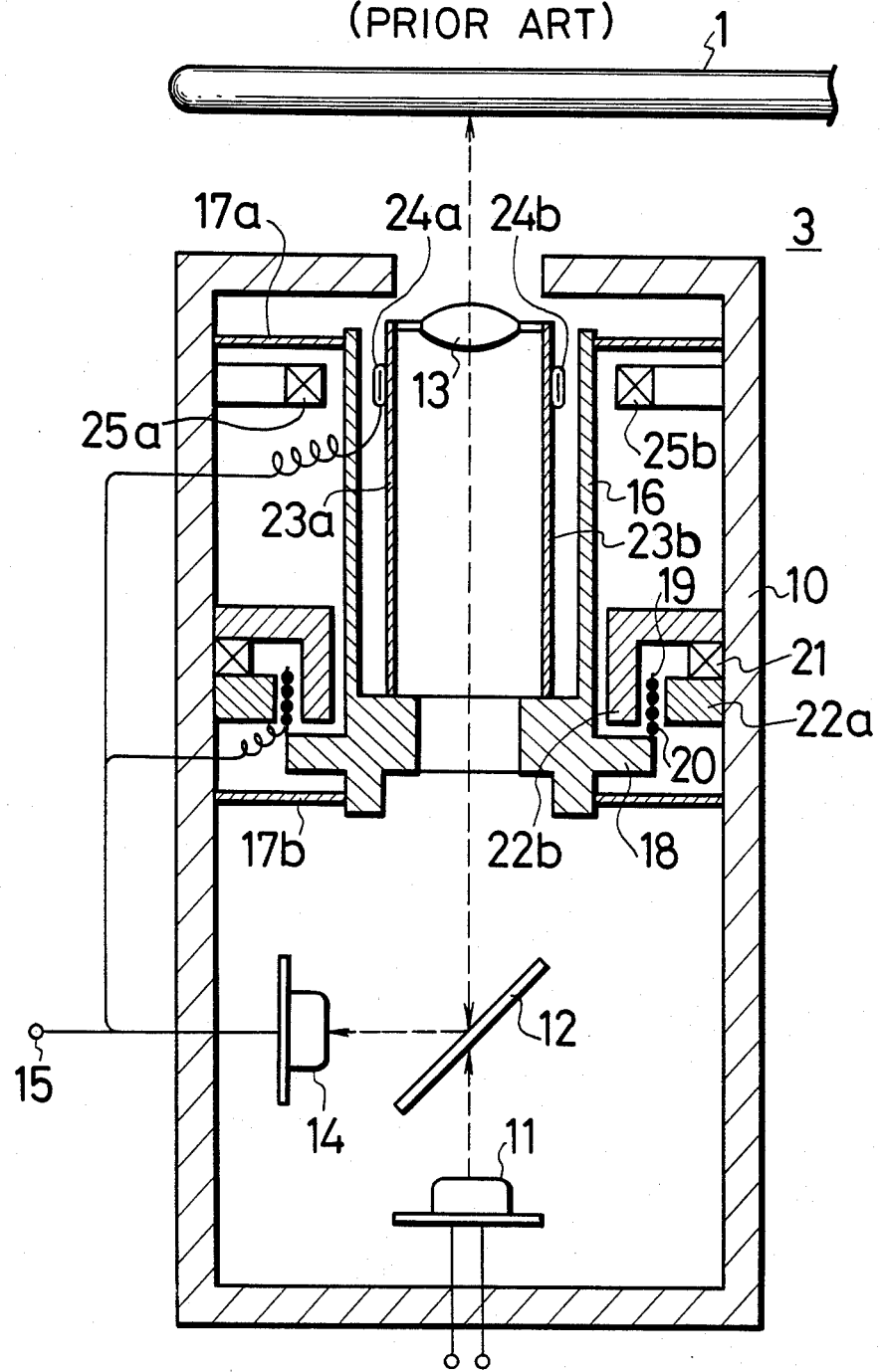
FIG. 2 is schematic, partially cross-sectional view of a pickup device used to reproduce the digital audio disc of the player of FIG. 1.

In FIG. 2, pickup device 3 of FIG. 1 is illustrated in which an outer casing 10 houses a laser light source 11, comprising, in the illustrated example, a semi-conductor laser. The laser light beam emitted from laser light source 11 is transmitted through a beam splitter 12 to an objective lens 13. The light beam from objective lens 13 is focused as a spot on the surface of DAD 1 where the information to be reproduced is recorded in tracks thereon. The light beam reflected from DAD 1 is supplied through objective lens 13 to beam splitter 12 where it is reflected thereon and supplied to a photodetector 14. A signal generated by photo-detector 14 is supplied to an output terminal 15. Photo-detector 14 also generates a focusing control signal and a tracking control signal, as will be more fully described hereinbelow.

A cylinder 16 has upper and lower ends coupled to outer casing 10 of pickup device 3 by springs 17a and 17b, respectively. Springs 17a and 17b permit cylinder 16 to move in a vertical direction.

A flange 18, positioned, for example, at a lower portion of cylinder 16, has a cylinder bobbin 19 formed coaxially with cylinder 16. A focusing coil 20 is formed about the periphery of bobbin 19 and in surrounding relation thereto.

A magnet 21 with plus and minus poles is attached to outer casing 10. The poles of magnet 21 are connected to the ends of yokes 22a and 22b. One end of yoke 22a is extended proximate the outer periphery of coil 20, while one end of yoke 22b is extended proximate the inner periphery of coil 20. Yokes 22a and 22b are preferably made of a magnetic material.

Two plate or leaf springs 23a and 23b extend parallel to each other from the lower end portion of cylinder 16 to an upper end portion. Objective lens 13 is supported between the upper or tip ends of leaf springs 23a and 23b. Tracking coils 24a and 24b are located near the upper ends of leaf springs 23a and 23b, and are wound in a vertical direction corresponding to the direction in which leaf springs 23a and 23b extend. Magnets 25a and 25b are provided within outer casing 10 and oppose coils 24a and 24b.

In the operation of pickup device 3, when current flows to focusing coil 20, cylinder 16 moves vertically in accord with the magnitude of the current flowing therethrough. When current flows to tracking coils 24a and 24b, leaf springs 23a and 23b move horizontally in response to the magnitude of the current flowing therethrough. If a focusing control signal is supplied to focusing coil 20, the light beam emitted from laser light source 11 through objective lens 13 to DAD 1 is accurately focused thereon at the focal point of objective lens 13. If a tracking control signal is supplied to tracking coils 24a and 24b, a tracking control operation is performed in which the pits or bumps comprising the information on DAD 1 are made coincident with the optical axis of objective lens 13.

Figure 3:
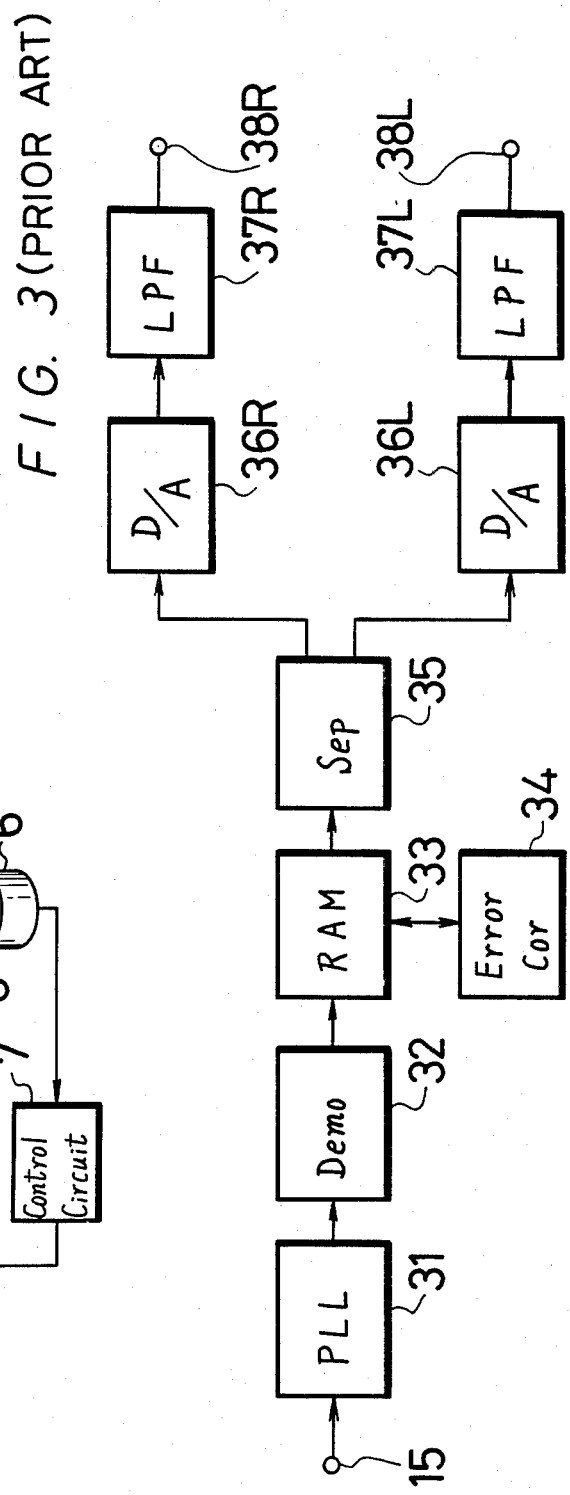
FIG. 3 is a block diagram illustrating a demodulating circuit for reproducing a signal from the prior art digital audio disc player of FIG. 1.

FIG. 3 illustrates a circuit for playing back a signal reproduced by a digital audio disc player, in which a signal from output terminal 15 (see FIG. 2) is supplied to a phase-locked loop (PLL) circuit 31 in which the phase fluctuation component of the reproduced signal is removed. The output signal from PLL circuit 31 is supplied to a demodulator 32 which generates a digital output signal. The digital signal from demodulator 32 is supplied to a random access memory (RAM) 33 and stored therein. An error correction circuit 34 applies an error correction to the digital signal stored in RAM 33. The error-corrected signal from RAM 33 is supplied to a left and right channel signal separation circuit 35 in which the left channel signal and the right channel signal are separated. The separated signals are supplied to digital-to-analog (D/A) conversion circuits 36R and 36L. The converted signals are supplied to low pass filters 37R and 37L and to output terminals 38R and 38L.

The movements of the tracking position of pick-up device 3 during playback are illustrated in FIGS. 4A through 4E, in which the tracks of a DAD 1 are illustrated in succession from left to right. In the figure, the left side represents the inner periphery of DAD 1, while the right side represents the outer periphery of DAD 1. The spaces between adjacent broken lines represent one circle of each track. The tracks of DAD 1 can be concentric tracks or successive turns of a spiral path. The cross-hatched area of FIG. 4 represents the portion of DAD 1 which contains an audio signal, such as music.

As shown in FIG. 4A, in the normal playback mode, the tracking position of pickup device 3 moves continuously from the inner periphery of disc 1 to the outer periphery thereof to reproduce the information recorded on disc 1.

In the slow-playback mode illustrated in FIG. 4B, pickup device 3 reproduces a predetermined first number of tracks of disc 1, namely a number equal to one track plus a fractional amount of one track, $\alpha$, and then the tracking position returns precisely one a predetermined integral number of tracks, namely track, whereby the playback operation reproduces the information (which may be silence) on one track plus an amount $\alpha$. In the slow-playback mode, the foremost point of the tracking position advances by an amount $\alpha$ for each revolution of DAD 1.

In the alternate slow-playback mode of FIG. 4C, pickup device 3 reproduces a predetermined first number of tracks, namely two tracks, and then the tracking position returns by a predetermined integral number of tracks, namely one track, providing a one-half slow-playback mode. In FIG. 4C, $\alpha$ represents a distance of one track.

FIG. 4D illustrates the movement of the tracking position of pickup device 3 in a reverse slow-playback mode in which pickup device 3 reproduces a predetermined first number of tracks of disc 1, namely a number equal to one track minus a fractional amount of one track, $\alpha$, and then the tracking position returns in an inward (reverse) direction by a predetermined integral number of tracks, namely one track. Accordingly, one playback operation reproduces the information on one track less the amount $\alpha$. The foremost point of the tracking position of pickup device 3 backs up an amount $\alpha$ for each revolution of DAD 1, similar to the slow-playback mode of FIG. 4B, where the foremost point of the tracking position advances an amount $\alpha$ for each revolution of disc 1.

FIG. 4E illustrates a one-half reverse slow-playback mode, in which the tracking position of pickup device 3 advances by a predetermined first number of tracks, namely two tracks in a forward direction, and then returns by a predetermined integral number of tracks, namely three tracks, similar to the operation of the slow-playback mode of FIG. 4C. In the one-half reverse slow-playback mode, $\alpha$ is one track.

The slow-playback mode and the reverse slow-playback mode described above are particularly useful in determining the beginning point of an audio signal such as music on DAD 1. For example, the slow-playback mode operation can be performed until pickup device 3 begins to reproduce the audio signal. The reverse slow-playback mode of pickup device 3 can then be utilized to back up the tracking position of pick-up device 3 until the audio signal disappears. The apparatus can then be operated in a standby mode, as illustrated in FIG. 4D', in which the tracking position of pickup device 3 advances by one track and then moves in a reverse direction by one track, so that it remains poised at the beginning of the audio signal.

Figure 5:
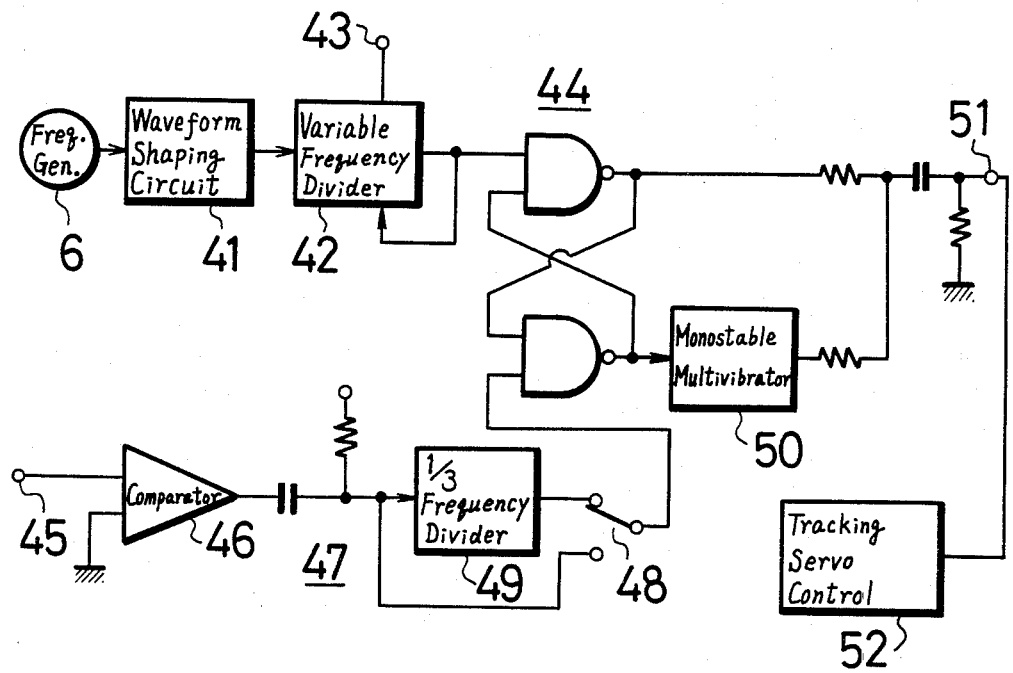
FIG. 5 is a block diagram illustrating a circuit for performing a slow-playback mode and a reverse slow-playback mode of a digital audio disc player in accord with the present invention.

FIG. 5 illustrates a circuit for controlling pickup device 3 in the slow-playback and reverse slow-playback modes. A signal derived from frequency generator 6 (see FIG. 1) is supplied to a waveform-shaping circuit 41 and then to a variable frequency-dividing circuit 42. If the number of teeth of frequency generator 6 is M, that is, if there are M pulses for each revolution of disc 1, variable frequency-dividing circuit 42 produces a frequency-dividing ratio of $1/(M \pm \alpha)$ in response to a suitable control signal applied to control terminal 43. The control signal applied to control terminal 43 is used to vary the amount $\alpha$ in the slow- playback and reverse slow-playback modes. A signal (see FIG. 6A) derived from variable frequency-dividing circuit 42 is supplied to a set terminal of a flip-flop circuit 44 so that the Q output of the latter goes high upon each pulse (FIG. 6A) from variable frequency-dividing circuit 42.

A tracking error signal (FIG. 6B) supplied from a tracking servo control circuit (not shown) is supplied to a terminal 45, and then to one input of a comparator 46 having its other input connected to ground. The positive portion of the signal supplied to comparator 46 is waveform-shaped and applied to a differentiating circuit 47 comprising a capacitor and a resistor. Differentiating circuit 43 supplies a pulse at the trailing edge of each signal supplied thereto. The pulse signal derived from differentiating circuit 47 is supplied directly to one input of a switch circuit 48, and is also supplied to another input of switch circuit 48 by a ⅓d frequency-dividing circuit 49. The signal selectively passed through switching circuit 48 is supplied to a reset terminal of flip-flop circuit 44.

The $\overline{Q}$ output of flip-flop circuit 44 is supplied to a monostable multivibrator 50 of a leading edge-trigger type. The Q output of flip-flop circuit 44 and an inverted output of monostable multivibrator 50 are added together and the DC components thereof are eliminated by a capacitor and a resistor connected to ground and the result is delivered to a terminal 51. The signal appearing at terminal 51 is supplied to a tracking servo control circuit 52 and coils 24a and 24b (see FIG. 2).

Figure 6A:
FIGS. 6A through 6C are waveform diagrams illustrating the operation of the circuit of FIG. 5.

FIG. 6A illustrates the output of variable frequency-dividing circuit 42. The output signal from frequency-dividing circuit 42 causes the output signal at terminal 51 to rise up, as shown in FIG. 6C.

Figure 6B:
Figure 6C:
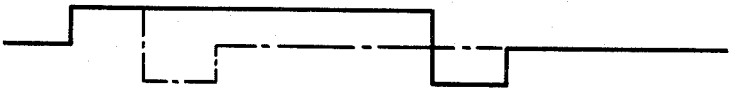

FIG. 6B illustrates a tracking error signal supplied to terminal 45 which may be, in one embodiment, a signal derived from a three-point method of tracking disc 1. In a three-point tracking method, three laser beams are directed onto disc 1. One laser beam reproduces the information on disc 1, and the other two laser beams are directed on the boundaries of the tracks. The laser beams directed on the boundaries are used to control the tracking position of the laser beam reproducing the information on disc 1.

The open circle marks of the curve of FIG. 6B indicate that pickup device 3 is tracking in the center of a track. The X marks indicate that pickup device 3 is tracking midway between adjacent tracks.

The signal of FIG. 6B is generated when the tracking position of pickup device 3 is moved in a reverse or inward direction across the previously scanned tracks on disc 1. Differentiating circuit 47 produces signals corresponding to the points denoted by the X marks.

The signals from differentiating circuit 47 are supplied to ⅓d frequency dividing circuit 49 which provides, when switch 48 is in the upper position, a pulse at the third X mark indicating that the tracking position of pickup device 3 has crossed three tracks. Flip-flop circuit 44 is triggered into a reset state to trigger monostable multivibrator 50, so that the output signal at terminal 51 drops to the low position, as shown in FIG. 6C.

The dashed lines of FIG. 6C indicate the output signal at terminal 51 when switch 48 is placed in the lower position, in which the tracking position of pickup device 3 moves in a reverse direction for only one track before moving in a forward direction. Accordingly, a reset pulse is supplied to flip-flop circuit 44 at the first X mark on the curve of FIG. 6B.

In the illustrated embodiment, the length of the pulse from monostable multivibrator 50 is chosen to be equal to the time required for the tracking position of pickup device 3 to traverse one-half of a track. This is indicated in FIG. 6C by the lower position of the output signal corresponding to the time between one X mark and one open circle in FIG. 6B. The signal at terminal 51 is supplied to tracking servo control circuit 52 which includes a summing circuit for summing the output provided from terminal 51. The summing circuit of tracking servo control circuit 52 may comprise an integration circuit. During the time when the signal at terminal 51 is at a high potential, tracking servo control circuit 52 causes the tracking position of the laser beam spot directed against disc 1 by pickup device 3 to move in a reverse or radially inward direction. The signal provided from tracking servo control circuit 52 determines how far cylinder 16 tilts, and thereby, the tracking position of pickup device 3. When the output signal at terminal 51 drops to the low position, a braking pulse is supplied to tracking servo control circuit 52 and acts as a brake with respect to the tilting of cylinder 16. In one embodiment, the braking pulse can be a reverse current which reduces the sum determined in tracking servo control circuit 52. Accordingly, the tracking position of the laser beam spot directed against disc 1 by pickup device 3 can be moved in a radially inward direction by one or three tracks.

Pickup device 3 moves continuously in a radially outward direction during the slow-playback and reverse slow-playback modes. The tracking position of the laser beam spot directed against the disc 1 by pickup device 3, however, can be altered by the above operation to move as much as 200 tracks in a radially inward or radially outward direction, in one embodiment of the invention.

Figure 7:
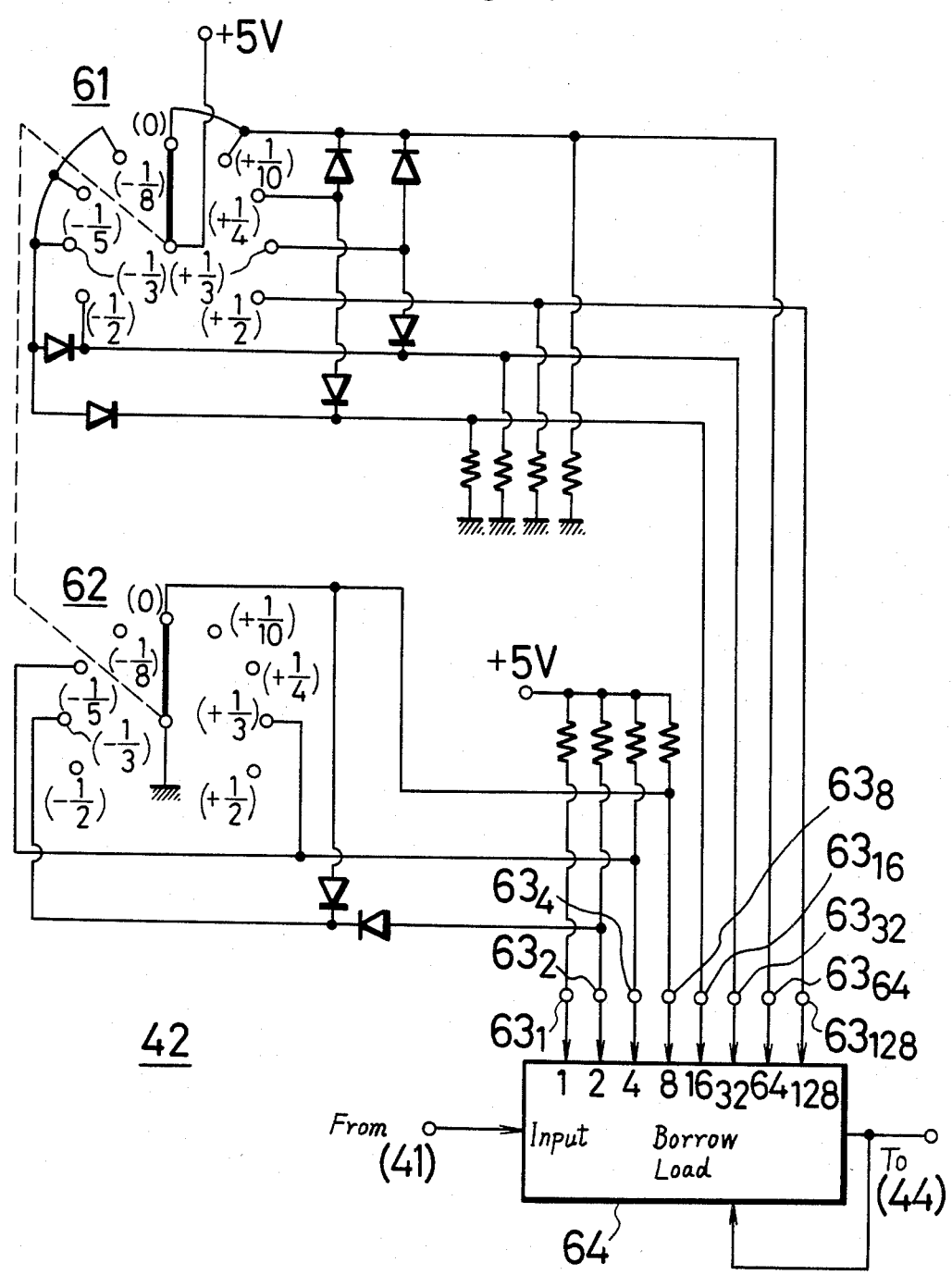
FIG. 7 is a schematic diagram illustrating a variable frequency-dividing circuit used with the circuit of FIG. 5.

FIG. 7 illustrates an exemplary variable frequency dividing circuit 42 which determines the movement of the tracking position of pickup device 3 in the slow-playback and reverse slow-playback modes according to a predetermined ratio. A down counter 64 is employed in which, for a desired frequency dividing number N, the number N−1 is preset. The borrow output from the down counter 64 is used as the frequency-dividing output, and the counter is repeatedly loaded by the borrow output. A change in the preset value N−1 alters the frequency dividing ratio.

In an exemplary embodiment, M, the number of pulses from frequency generator 6 for each revolution of disc 1, is equal to 72. The following relations can be calculated among the frequency dividing number N, the playback ratio (1−72/N), and the preset value (N−1), as detailed in the following table.

| N | 1−72/N | N − 1 |
| --- | --- | --- |
| 144 | +0.5 | 143 = [10001111]$_2$ |
| 108 | +0.333 | 107 = [01101011]$_2$ |
| 96 | +0.25 | 95 = [01011111]$_2$ |
| 80 | +0.1 | 79 = [01001111]$_2$ |
| 72 | 0 | 71 = [01000111]$_2$ |
| 64 | −0.125 | 63 = [00111111]$_2$ |
| 60 | −0.2 | 59 = [00111011]$_2$ |
| 54 | −0.333 | 53 = [00101111]$_2$ |
| 48 | −0.5 | 47 = [00100011]$_2$ |

In the above table, each of the negative values for the playback ratio, 1−72/N, represents a reverse slow-playback mode. The entries in the right hand column of the table represent the binary coded equivalents of the decimal numbers (N−1).

In FIG. 7, first and second rotary switches 61, 62 are ganged together, with the rotor or sliding piece of first rotary switch 61 supplied to a voltage of +5 V, and the rotor or sliding piece of second rotary switch 62 connected to ground. Output terminals 63$_1$, 63$_2$, 63$_4$, and 63$_8$ are connected through resistors to a voltage +5 V. Output terminal 63$_2$ is connected through a diode to the switch contact of switch 62 corresponding to a playback ratio of −$\frac{1}{3}$. Output terminal 63$_4$ is connected to the switch contacts of switch 62 corresponding to playback ratios of −1/5 and +$\frac{1}{3}$. Output terminal 63$_8$ is connected to the switch contact of switch 62 corresponding to a zero (0) playback ratio, and also through a diode to the line connected to output terminal 63$_2$.

Output terminals 63$_{16}$, 63$_{32}$, 63$_{64}$ and 63$_{128}$ are connected to ground through resistors. In addition, output terminal 63$_{16}$ is connected through a diode to the switch contacts of switch 61 corresponding to the playback ratios of −$\frac{1}{8}$, −1/5, −$\frac{1}{3}$, and through another diode to the switch contact corresponding to the playback ratio of −$\frac{1}{2}$. Output terminal 63$_{32}$ is connected to the switch contact of switch 61 corresponding to a playback ratio of −$\frac{1}{2}$. The switch contact of switch 61 corresponding to a playback ratio of +$\frac{1}{3}$ is connected through a diode to the line connecting output terminal 63$_{32}$ to the switch contacts of switch 61 corresponding to playback ratio of −$\frac{1}{2}$ and through another diode to a line connecting output terminal 63$_{64}$ and the switch contacts of switch 61 corresponding to the playback ratios of zero (0) and +1/10. The switch contact of switch 61 corresponding to a playback ratio of +$\frac{1}{4}$ is connected through a diode to the line connecting the switch contacts of switch 61 corresponding to the playback ratios of zero (0) and +1/10 to output terminal 63$_{64}$ and through a second diode to the line connecting input terminal 63$_{16}$ to switch 61. Output terminal 63$_{128}$ is connected to the switch contact of switch 61 corresponding to a playback ratio of +$\frac{1}{2}$.

An input terminal of down counter 64 is supplied a signal from waveform-shaping circuit 41 of FIG. 5. The borrow output of down counter 64 is supplied to flip-flop circuit 44 and to the load input of down counter 64, and operates as described above.

Although a specific embodiment of the present invention has been described in detail herein with reference to the accompanying drawings, is to be understood that the invention is not limited to that precise embodiment, and that various changes and modifications may be effected therein by one skilled in the art without departing from the spirit and scope of the invention as defined in the appended claims.

What is claimed is:
1. An apparatus for optically reproducing audio information recorded on an optical disc in substantially circular tracks on the latter, said information being recorded in at least one signal segment having a beginning portion which is intended to be the first portion thereof reproduced and which is immediately preceded by a blank segment; said apparatus comprising:
   means for rotating said disc at a constant linear velocity;
   pickup means for reproducing said information recorded on said disc in said tracks;
   tracking control means for adjusting the tracking position of said pickup means in forward and reverse directions which are transverse with respect to said tracks; and
   means operative through said tracking control means for selectively establishing a slow-playback mode and a reverse slow-playback mode in each of which, after said pickup means reproduces a respective predetermined first number of said tracks while moving in said forward transverse direction, said tracking position of said pickup means is moved in said reverse transverse direction a respective predetermined integral number of said tracks, said predetermined integral number of said tracks being less than twice said predetermined first number of said tracks;
   said means operative through said tracking control means also selectively establishing a standby mode in which, after said pickup means reproduces a given integral number of tracks while moving in said forward transverse direction, said tracking position of said pickup means is moved said given integral number of tracks in said reverse transverse direction;
   whereby said pickup means is adapted first to find, and then to remain poised at, said beginning portion of said signal segment.
2. The apparatus of claim 1; wherein said predetermined integral number of said tracks is less than said predetermined first number of said tracks in said slow-playback mode.
3. The apparatus of claim 2; wherein said predetermined integral number of said tracks is greater than said predetermined first number of said tracks in said reverse slow-playback mode.
4. The apparatus of claim 3; wherein said predetermined first number of said tracks is a fractional portion of one of said tracks plus one of said tracks in said slow-playback mode.
5. The apparatus of claim 4; wherein said predetermined first number of said tracks is a fractional portion of one of said tracks in said reverse slow-playback mode.
6. The apparatus of claim 3, in which said disc has a center of rotation; and wherein said forward and reverse transverse directions are radial directions with respect to said center of rotation.
7. The apparatus of claim 6; wherein said means for selectively establishing includes first means for determining said predetermined first number of said tracks and means for determining said second predetermined integral number of said tracks.
8. The apparatus of claim 7; wherein said first means for determining includes frequency generator means for generating signals synchronized with said rotation of said disc, and variable frequency dividing means for selectively dividing said signals from said frequency generator means.

9. The apparatus of claim 8; wherein said second means for determining includes means for counting said tracks when said tracking position of said pickup means moves in said reverse transverse direction, and selector means for determining first and second integral numbers of said tracks traversed in said reverse transverse direction.

10. The apparatus of claim 9; wherein said first integral number of said tracks is one and said second integral number of said tracks is three.

11. The apparatus of claim 9; in which said means for counting generates a pulse signal for each said track traversed in said reverse transverse direction; and wherein said selector means includes frequency dividing means for dividing said pulse signal by one of said integral numbers of said tracks, and further includes switch means for selectively connecting said counting means and said frequency dividing means to said tracking control means.

12. The apparatus of claim 11; wherein said variable frequency dividing means includes switch means for generating signals to select said slow-playback mode and said reverse slow-playback mode, and down counter means receiving said signals from said switch means and having a clock input terminal receiving said signals from said frequency generator means, a borrow output terminal supplying a borrow output signal to said tracking control means, and a load terminal receiving said borrow output signal.

13. The apparatus of claim 12; wherein said signals from said switch means are binary coded number signals.

14. The apparatus of claim 1; wherein said given integral number of tracks equals one.

* * * * *